W. H. JAMES.
Trolling Fish-Hooks.
No. 146,764.
Patented Jan. 27, 1874.
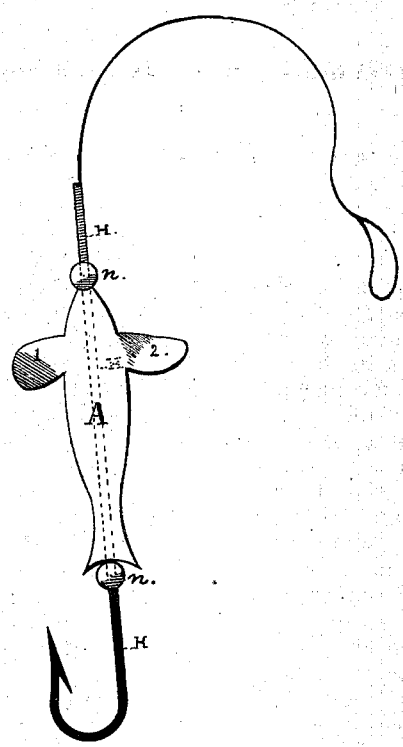
WITNESSES:
INVENTOR:

UNITED STATES PATENT OFFICE.

WILLIAM H. JAMES, OF BROOKLYN, NEW YORK.

IMPROVEMENT IN TROLLING FISH-HOOKS.

Specification forming part of Letters Patent No. 146,764, dated January 27, 1874; application filed October 6, 1873.

*To all whom it may concern:*

Be it known that I, WM. H. JAMES, of the city of Brooklyn, in the county of Kings and State of New York, have made certain novel and useful Improvements in Revolving Baits, termed "spinning squids," forming a part of a fish-hook for large fish; and I declare in what manner the same is to be constructed and arranged in connection with the hook by the following specification, with the accompanying drawing, which is lettered to correspond with and form a part of the same.

To enable the public to understand the nature of my said improvement, and those skilled in the mechanic arts to construct the same, I will describe it as follows, to wit:

The figure represents a plan of my spinning bait or squid A, showing in dotted lines its axis, propeller-formed buckets or fins 1 and 2; also showing the small balls or beads $n\ n$, which hold the fish A upon the center of the shank of the hook H, while it revolves upon the same by the action of the water, thereby attracting the fish.

I am aware that revolving bait is in common use, and I am also aware that said revolving bait or squid is operated upon a shackle or swivel.

What I claim as new, and wish to protect by Letters Patent, is—

In combination with the shank H and balls $n\ n$, the spinning bait A, provided with the propeller-shaped fins 1 and 2, constructed and arranged substantially in the manner and for the purpose set forth.

In testimony whereof I hereunto subscribe my name in the presence of two witnesses.

WILLIAM H. JAMES.

Witnesses:
 JAMES P. MACLEAN,
 E. R. HENRY.